US006609717B2

United States Patent
Hinson

(10) Patent No.: US 6,609,717 B2
(45) Date of Patent: Aug. 26, 2003

(54) THERMOPLASTIC GASKET WITH EDGE BONDED RUBBER APERTURES AND INTEGRAL ALIGNMENT GROMMETS

(75) Inventor: Kerry D. Hinson, Buchanan, TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/974,715

(22) Filed: Oct. 9, 2001

(65) Prior Publication Data

US 2003/0067122 A1 Apr. 10, 2003

(51) Int. Cl.$^7$ ................................................. F02F 11/00
(52) U.S. Cl. ........................ 277/598; 277/593; 277/596; 277/637
(58) Field of Search ............................. 277/592–4, 596, 277/598, 637

(56) References Cited

U.S. PATENT DOCUMENTS

| | | | | |
|---|---|---|---|---|
| 3,203,304 A | * | 8/1965 | Rapata ........................ 277/637 |
| 3,655,210 A | * | 4/1972 | Farnam et al. ............... 277/592 |
| 3,794,333 A | * | 2/1974 | Czernik et al. .............. 277/593 |
| 4,524,979 A | * | 6/1985 | Bauder ........................ 277/598 |
| 4,635,949 A | | 1/1987 | Lucas et al. |
| 4,730,836 A | * | 3/1988 | Miller et al. ............. 123/198 E |
| 4,796,897 A | | 1/1989 | Inciong |
| 4,817,969 A | | 4/1989 | McDowell et al. |
| 4,819,954 A | * | 4/1989 | Fucci et al. ................. 277/598 |
| 4,867,461 A | * | 9/1989 | Shimmell .................... 277/593 |
| 5,033,189 A | | 7/1991 | Desverchere et al. |
| 5,054,793 A | * | 10/1991 | Hauenstein et al. ......... 277/313 |
| 5,121,932 A | * | 6/1992 | Goldman et al. ......... 123/90.37 |
| 5,295,698 A | | 3/1994 | Agarwal et al. |
| 5,364,109 A | * | 11/1994 | Sihon .......................... 277/592 |
| 5,513,603 A | * | 5/1996 | Ang et al. ............... 123/198 E |
| 5,645,282 A | * | 7/1997 | Belter ......................... 277/598 |
| 5,700,017 A | | 12/1997 | Tensor |
| 5,716,051 A | * | 2/1998 | Cornea et al. ............... 277/609 |
| 5,941,286 A | * | 8/1999 | Fauble et al. ............... 138/137 |
| 6,039,323 A | * | 3/2000 | Mockenhaupt et al. ..... 277/593 |
| 6,161,840 A | * | 12/2000 | Boardman et al. .......... 277/593 |
| 6,231,053 B1 | * | 5/2001 | Wakamatsu .................. 277/628 |
| 6,241,253 B1 | * | 6/2001 | Dempsey et al. ............ 277/596 |
| 6,247,703 B1 | * | 6/2001 | Forry et al. ................. 277/592 |
| 6,318,731 B1 | * | 11/2001 | Belter ......................... 277/591 |

\* cited by examiner

*Primary Examiner*—Anthony Knight
*Assistant Examiner*—Alison K. Pickard
(74) *Attorney, Agent, or Firm*—Rader, Fishman & Grauer PLLC

(57) ABSTRACT

A gasket for sealing an intake manifold of an internal combustion engine, includes a plastic body defining substantially co-planar surfaces that define top and bottom surfaces of the gasket. Each of a plurality of air intake apertures includes an interiorly molded circumferential elastomeric edge bead. Each aperture edge includes a circumferential array of small openings for mechanical securement of the elastomeric bead to the plastic carrier, and each opening fills with elastomer upon the overmolding of the bead to the edge during manufacture. The gasket also includes primary and secondary compression limiters, formed of powdered metal in described embodiment, located immediately adjacent bolt holes and symmetrically between air intake apertures, respectively. Finally, the gasket includes flexible locator grommets for assuring positive alignment between the cylinder head and intake manifold. Each locator includes a frustum-like body and a cylindrical post extending oppositely outwardly of top and the bottom of the gasket, respectively.

12 Claims, 4 Drawing Sheets

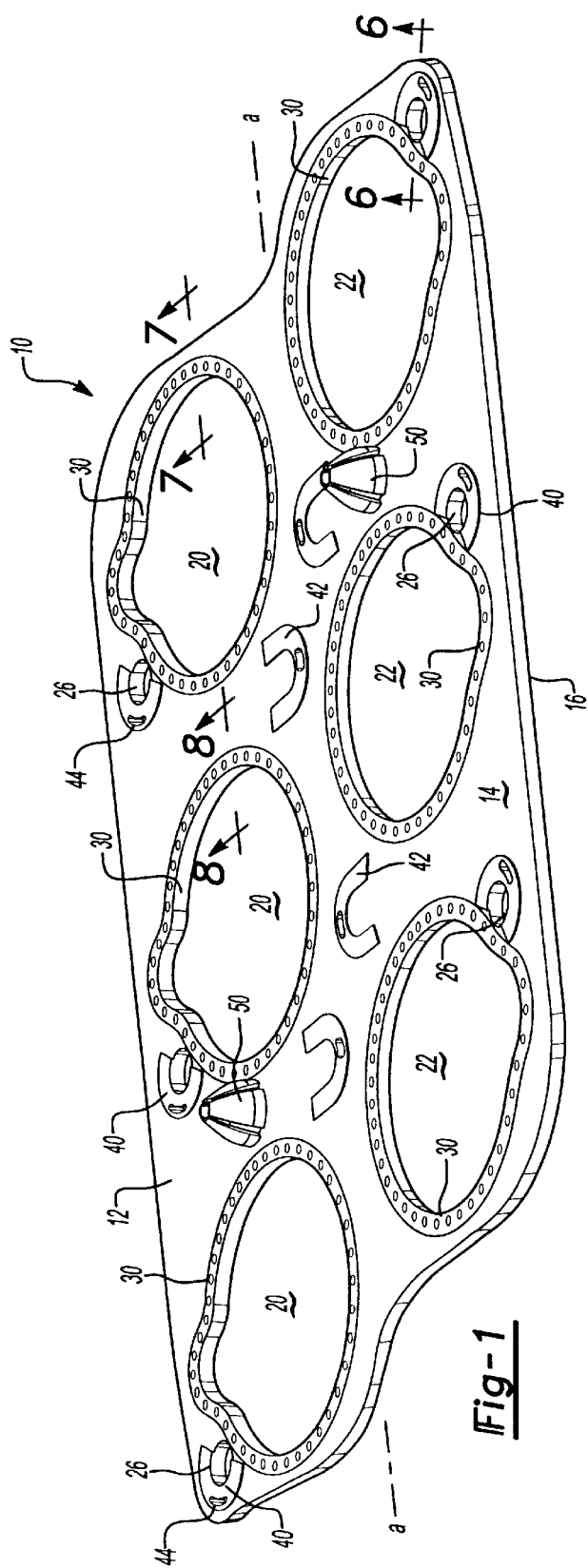
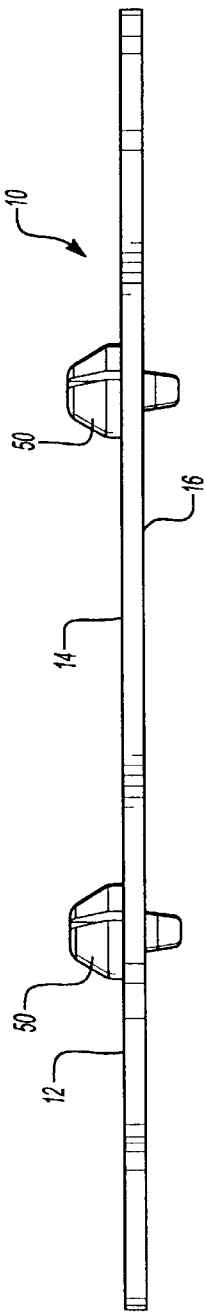

THERMOPLASTIC GASKET WITH EDGE BONDED RUBBER APERTURES AND INTEGRAL ALIGNMENT GROMMETS

BACKGROUND OF THE INVENTION

1. Field of Invention

This invention relates generally to improvements in manufacturing gaskets for sealing components that interface with internal combustion engines, such as air intake manifolds. More particularly, the invention relates to improvements in designs of bottom intake manifold gaskets for providing thermal insulation between the interface of an engine cylinder head and an air intake manifold, as well as reduction in number of component parts involved in the manufacture of such gaskets.

2. Description of the Prior Art

Even though engines have become more robust with respect to sizes and horsepower demands in recent years, and in spite of the fact that under-the-hood operating temperatures have tended to increase, the use of plastic intake manifolds has proliferated. Simultaneously, there has been a significant increase in the use of under-the-hood electronic components, some extending into or protruding out of such plastic intake manifolds. As a result, there is constant and increasing pressure to achieve lower operating temperatures in the environment of plastic intake manifold structures utilized in new engines.

Moreover, it has been long recognized that plastic materials tends to degrade over time, particularly as a function of amount of heat to which plastic components are subjected. Thus, isolating heat transfer, especially between metal engine components and mating plastic components (such as between engine cylinder head and newer plastic manifolds), has become a continuing effort, if not a consuming passion, for various engine designers in the automotive world.

In addition to degradation of plastic materials when subject to high thermal inputs, plastic material warpage, with commensurate issues of creep and relaxation, work to impair sealing at various manifold ports or openings. The sealing aspect is particularly important for various components that directly interface with the manifold, such as mass airflow sensors. To the extent that metal carrier bodies have been the traditional material of choice for lower manifold gaskets, a major improvement in this art area would be well received, particularly as relating to gasket materials adapted to provide greater heat insulation and weight reduction.

Finally, the use of alignment grommets has been crucial for assuring proper placement of bottom intake manifold gaskets on cylinder head deck areas. Traditionally, such grommets have been formed separately, and have had to be assembled at the time of, or just prior to, placement of the gasket on a cylinder head deck. This has resulted in separate handling and stocking requirements of additional component parts, which could be eliminated if such grommets were formed as integral parts of the gasket carrier bodies.

SUMMARY OF THE INVENTION

A gasket for sealing an intake manifold of a dual cylinder head on an internal combustion engine is comprised of a plastic carrier having a pair of substantially planar surfaces that define top and bottom surfaces. The gasket includes a plurality of air intake apertures that extend between the surfaces. Each intake aperture has an elastomeric bead circumferentially bonded to the edges of the carrier. The edges define the interior boundaries of the apertures, and in the described embodiment include a series of small openings for mechanical attachment of the elastomeric bead to the plastic carrier.

The gasket includes primary and secondary compression limiters made of powdered metal in the described embodiment. The compression limiters are located, respectively, adjacent to bolt holes and symmetrically between air intake apertures. The gasket also includes flexible alignment grommets that assure positive alignment between cylinder head and intake manifold structures to be secured together. Each of the grommets is comprised of a frustum-like body and a cylindrical post, each extending outwardly of the top and the bottom surfaces of the gasket, respectively. The frustum-like body and post are sized and configured to mate with conical and cylindrical alignment depressions and/or openings in respective intake manifold and engine cylinder head. The converging walls of the frustum-like body portion are comprised of trapezoidal-like petals joined to the base of the frustum-like body, which permits radial flexing. The post, which is nominally located along the symmetry axis of each locator, is mounted to the base of the locator with flexible, radially extending spokes, which permit lateral flexing to assure proper alignment between cylinder head deck and manifold structures.

BRIEF DESCRIPTION OF THE DRAWINGS

FIG. 1 is a perspective view of an intake manifold gasket constructed in accordance with the present invention.

FIG. 2 is a side elevation view of the intake manifold gasket of FIG. 1.

DETAILED DESCRIPTION OF THE EMBODIMENTS

Figure 3:
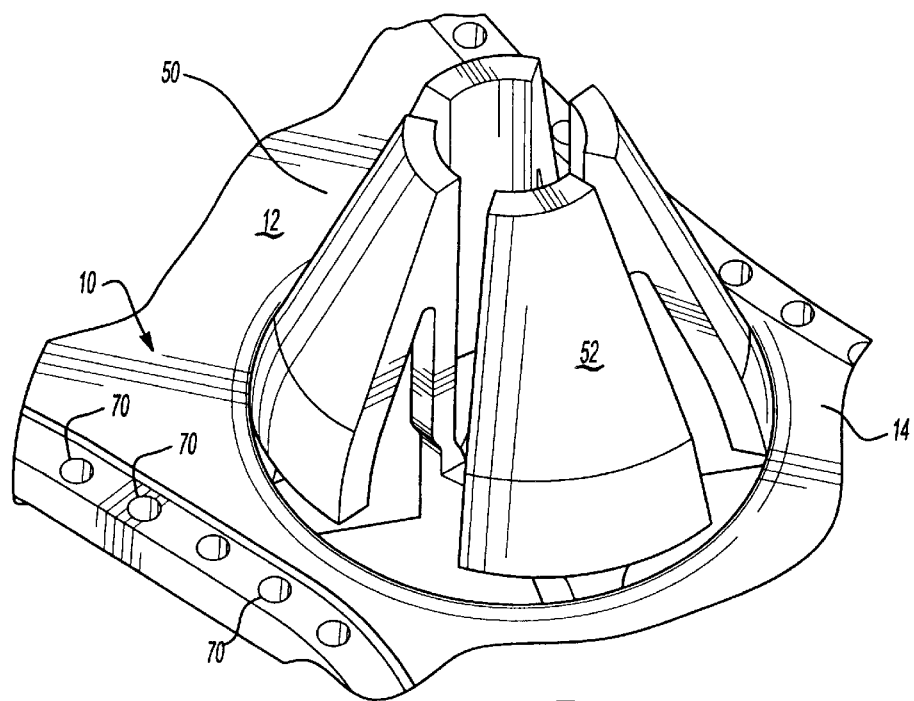
FIG. 3 is fragmentary perspective view of a locating and/or alignment feature of the intake manifold gasket of the present invention.

Referring initially to FIGS. 1 and 2, an intake manifold gasket 10 is constructed in accordance with the present invention. The gasket 10 is adapted for sealing between a manifold and a cylinder head deck (neither shown), as would be situated between a pair of spaced cylinder head banks located atop of a V-8 style internal combustion engine (neither shown), for example.

The gasket 10 includes a plastic carrier body 12 having a top surface 14 and a bottom surface 16 (FIG. 2). The top surface 14 is adapted to interface with and seal an intake manifold, while the bottom surface 16 interfaces with a cylinder head deck to which the manifold is to be secured. For this purpose, the gasket includes a plurality of air intake apertures 20 located on one asymmetrically offset side of a longitudinal axis a-a of the gasket 10, and includes a like plurality of air intake apertures 22 situated on an opposite offset side of the axis a-a, as shown.

A plurality of bolt apertures 26 are situated immediately adjacent each air intake aperture 20, 22 to accommodate bolts (not shown) for securing the manifold to the cylinder head deck, to sandwich the gasket 10 therebetween for airtight sealing between manifold and deck structures.

Each air intake aperture 20, 22 defines a boundary that includes an elastomeric bead 30 circumferentially bonded thereto. Each bead 30 is C-shaped (in cross-section), in that it partially overlaps top and bottom surfaces 14, 16 of the carrier body 12.

Embedded in the plastic carrier body 12 are a plurality of C-shaped compression limiters to 40, 42. The limiters are for ensuring that neither the elastomeric bead nor the plastic carrier body 12 are or become overcompressed upon or after securement of the gasket between the manifold and the cylinder head deck via the above-noted bolts that pass through the apertures 26.

The so-called primary compression limiters 40 are situated immediately adjacent, and surround, the bolt holes 26. The secondary compression limiters 42 are spatially arranged between respective sets of air intake apertures 20 and 22. Both the primary and secondary compression limiters 40, 42 are formed of powdered metal in the described embodiment, and each is positioned at the bottom of a mold prior to the forming of the plastic carrier 12. As such, the limiters 40, 42 are entirely embedded within the body of the plastic carrier 12, and contain mold pinholes 44 for securing the limiters to the bottom of the mold and for retaining them in position during molding of the plastic carrier 12. Finally, the plastic carrier 12 incorporates a plurality (at least two in the described embodiment) flexible alignment grommets 50, each in the form of a frustum having an axis b-b (FIG. 4).

Figure 4:
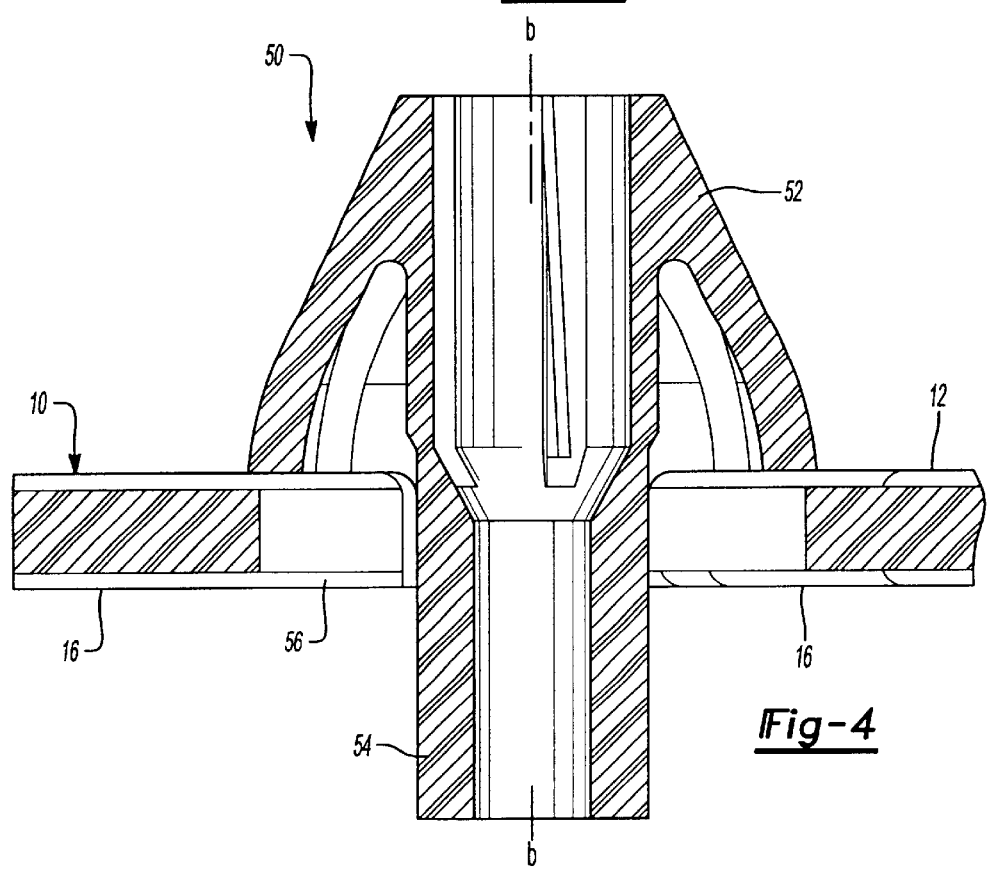
FIG. 4 is a fragmentary cross-sectional view of the locating feature of FIG. 3.
Figure 5:
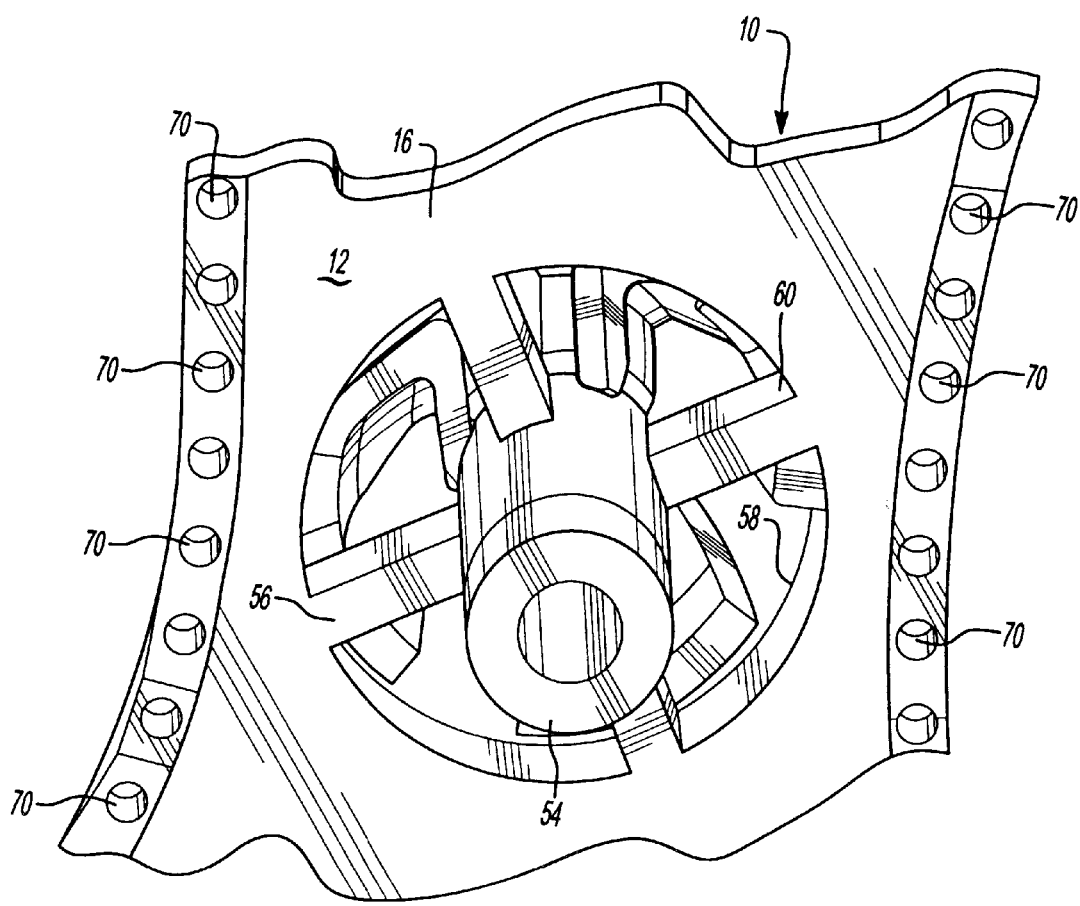
FIG. 5 is another fragmentary perspective view of the same locating feature.

Referring now to FIGS. 3, 4, and 5, each frustum 50 includes a plurality of petal-like, trapezoidal-shaped flexible elements 52. The elements 52 are formed of connected converging walls adapted to collapse together to accommodate radial flexing upon interface with a manifold structure to be secured thereagainst. Thus, the defined structure of the frustum 50 provides a highly flexible medium against which a manifold may be secured under conditions of relatively wide tolerances.

Referring particularly to FIGS. 4 and 5, the frustum 50 further includes a cylindrical post 54 that extends from the bottom surface 16 of the carrier 12. The post 54 of each frustum 50 protrudes through a locator aperture 58 having a circular boundary 60 to which are attached radially extending spokes 56. The spokes operate to provide flexibility to the post 54, which is adapted for insertion within apertures (not shown) that are provided in a cylinder head deck. The spokes allow for a relatively high degree of tolerance between the gasket 10 and the cylinder head deck.

Figure 6:
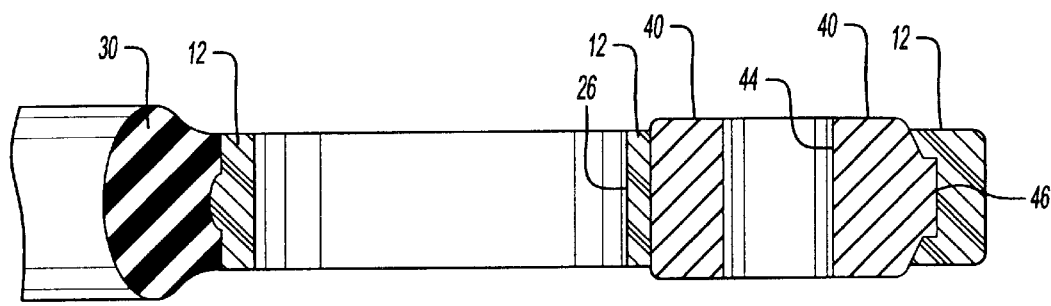
FIG. 6 is a cross-sectional view of a portion of the intake manifold gasket, along lines 6—6 of FIG. 1.
Figure 7:
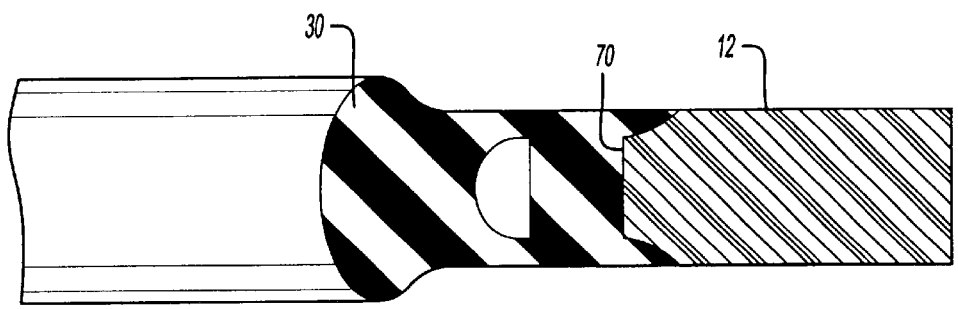
FIG. 7 is another cross-sectional view of the gasket, along lines 7—7 of FIG. 1.
Figure 8:
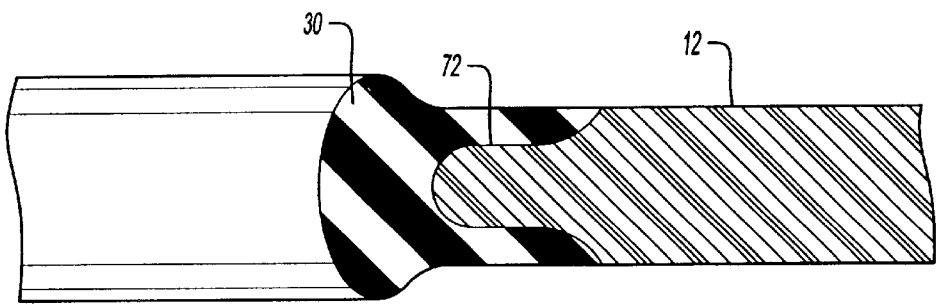
FIG. 8 is yet another cross-sectional view of the gasket, along lines 8—8 of FIG. 1.

Referring to FIGS. 6, 7, and 8, a process of manufacturing the intake manifold gasket 10 can be described as follows. First the powdered metal compression limiters 40, 42 are manufactured. Next a mold (not shown) is provided for the manufacture of the thermoplastic carrier 12, and the powdered metal limiters 40, 42 are placed on the bottom of the mold. Upwardly extending pins (not shown) extend through molded pinholes 44 of the limiters. A thermoplastic material is injected into the mold, over and around the limiters 40, 42, to form the carrier 12 containing embedded limiters 40, 42. Referring specifically to FIG. 6, a portion of the carrier taken through section 6—6 of FIG. 1 displays a corner portion of the intake manifold gasket 10. The corner portion depicted includes a cross-section of an elastomeric bead 30 circumferentially bonded to an edge of the intake manifold gasket 10, wherein the body of the carrier 12 includes the bolt aperture 26 and a compression limiter 40. It will be noted that the limiter 40 incorporates a circumferentially extending side flange 46 that insurers its axial securement within the plastic carrier body 12.

Finally, after the thermal plastic material of the carrier 12 is cured, the elastomeric beads 30 are applied to the plurality of air intake apertures 20, 22. Referring now specifically to FIGS. 3, 5, and 7, a series of small holes 70 are arranged circumferentially about each of the apertures 20, 22. FIG. 7 is a cross-section taken through one of the holes 70. FIG. 8 is a similar cross-section taken through a space between two holes 70. The holes 70 provide a means by which the elastomeric material can flow through a reduced thickness edge 72 of the apertures 20, 22 and provide a mechanical securement means. Thus, not only is the bead 30 chemically bonded to the reduced edge 72, it is also mechanically secured to the edge to provide a more secure connection between the elastomer bead 30 and the material of the thermoplastic carrier 12.

In the described embodiment, the reduced thickness aperture edges 72 have a material thickness of approximately 1.5 mm (top to bottom), and each edge 72 is approximately 3.5 mm wide measured radially. Apart from the edge 72, the distance between the top planar surface 14 and bottom planar surface 16 is approximately 2.8 mm.

In the described embodiment, the plastic carrier 12 is made of a proprietary glass-filled (30 wt. %) polyamide (nylon 4/6) obtained from DSM Corporation under the trade name "STANYL". The elastomeric beads 30 are formed of a thermoplastic material, e.g. fluroelastomeric rubber material.

Although the gasket 10 has been described as a bottom air intake manifold gasket, the gasket as presented herein may have broader applicability than as described. For example, the air intake apertures 20, 22 could be more broadly characterized as "service apertures" that are suitable for other functions.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A gasket comprising:
   a carrier body having a first surface, a second surface, and service apertures defining edges that extend from the first surface of the carrier layer to the second surface of the carrier layer;
   elastomeric beads circumscribing said service apertures, the elastomeric beads being bonded to said edges of said carrier body and overlapping said edges to extend partially over the first and second surfaces of the carrier layer, wherein said carrier body comprises a thermoplastic material and said elastomeric beads comprise a fluoroelastomer material;
   a plurality of primary crush limiters molded into said carrier body;
   a plurality of bolt holes, each bolt hole positioned next adjacent one of said service apertures, each bolt hole having one of said crush limiters at least partially surrounding said bolt hole;
   a set of secondary crush limiters, said secondary set of limiters positioned symmetrically between said apertures, spaced from said bolt holes; and a plurality of flexible alignment grommets, each grommet defined by a frustum shaped body comprising a plurality of converging trapezoidal-shaped petals that form converging walls adapted to flexibly collapse together, wherein each of said alignment grommets is integrally connected to said carrier body of said gasket, wherein each of said alignment grommets defines an axis orthogonal to said planar carrier body, wherein each of said alignment grommets comprises a cylindrical post that extends through a locator aperture within said carrier body, and wherein radially extending spokes connect said carrier body to said post to permit flexing of said post.

2. The gasket of claim 1 wherein said service apertures comprise edges of reduced thickness at the boundaries of said service apertures, and said reduced thickness edges comprise a plurality of mold holes.

3. The gasket of claim 2 wherein said carrier comprises nylon 4/6 material.

4. The gasket of claim 3 comprising an intake manifold gasket for sealing a manifold attached to a dual cylinder head, internal combustion engine.

5. A gasket comprising a plastic carrier body having a pair of substantially planar surfaces that define the top and bottom of the gasket, wherein the gasket includes a plurality of service openings that extend between said pair of surfaces, said gasket further comprising a plurality of elastomeric beads bonded to edges said service openings, wherein said service openings include a series of small holes that aid in mechanical attachment of the elastomeric bead to the plastic carrier body, and wherein said carrier body further comprises bolt holes for attachment of said gasket between an engine cylinder head deck and a manifold, and wherein said carrier body also comprises primary and secondary compression limiters formed of powdered metal molded into said body, and wherein said primary limiters are located adjacent to said bolt holes, the gasket further comprising flexible alignment grommets that provide positive alignment between the cylinder head deck and the intake manifold, each grommet comprising a frustum-shaped body and a cylindrical post that extends outwardly of said planar top and bottom surfaces of the gasket, respectively, and wherein the frustum-shaped body and post are sized and configured to mate with conical and cylindrical alignment openings in the intake manifold and the cylinder head deck, and wherein the frustum-shaped body defines a plurality of converging walls defined by trapezoidal-like petals to permit flexing of said grommet, and wherein said post is mounted to said carrier body with flexible spokes to permit lateral flexing of said post, said plastic carrier body comprising a glass-filled (30 wt. %) polymide (nylon 4/6).

6. A gasket comprising:
a carrier body having a first surface, a second surface, and at least one service aperture defining edges that extend from the first surface of the carrier layer to the second surface of the carrier layer;
elastomeric beads circumscribing said service aperture, the elastomeric beads being bonded to said edges of said carrier body and overlapping said edges to extend partially over the first and second surfaces of the carrier layer; at least one crush limiter molded onto said carrier body;
a plurality of bolt holes, each bolt hole positioned adjacent one of said service apertures at least one of said bolt holes having said at least one crush limiter at least partially surrounding said at least one; and
at least one flexible alignment element, each element defined by a frustum shaped body comprising a plurality of converging trapezoidal-shaped petals that form converging walls adapted to flexibly collapse together, wherein each of said alignment elements is integrally connected to said carrier body of said gasket, wherein each of said alignment elements defines an axis orthogonal to said planar carrier body, wherein each of said alignment element comprises a cylindrical post that extends through a locator aperture within said carrier body, and wherein radially extending spokes connect said carrier body to said post, and wherein at least one alignment element laterally flexes when said gasket is assembled.

7. The gasket of claim 6 wherein said service apertures comprise edges of reduced thickness at the boundaries of said service apertures, and said reduced thickness edges comprise a plurality of mold holes.

8. The gasket of claim 6 wherein said carrier comprises a thermoplastic material.

9. The gasket of claim 6 wherein said elastomeric beads comprises a fluoroelastomer material.

10. The gasket of claim 6 comprising an intake manifold gasket for sealing a manifold attached to a dual cylinder head, internal combustion engine.

11. A gasket comprising:
a carrier body having a first surface, a second surface, and service apertures defining edges that extend from the first surface of the carrier layer to the second surface of the carrier layer;
elastomeric beads circumscribing said service apertures, the elastomeric beads being bonded to said edges of said carrier body and overlapping said edges to extend partially over the first and second surfaces of the carrier layer, wherein said carrier body comprises a thermoplastic material and said elastomeric beads comprise a fluoroelastomer material;
a plurality of flexible alignment grommets, each grommet defined by a frustum shaped body comprising a plurality of converging trapezoidal-shaped petals that form converging walls adapted to flexibly collapse together, wherein each of said alignment grommets is integrally connected to said carrier body of said gasket, wherein each of said alignment grommets defines an axis orthogonal to said planar carrier body, wherein each of said alignment grommets comprises a cylindrical post that extends through a locator aperture within said carrier body, and wherein radially extending spokes connect said carrier body to said post to permit lateral flexing of said post.

12. The gasket of claim 11 further comprising a plurality of primary crush limiters molded into said carrier body, and wherein said gasket further comprises a plurality of bolt holes, each bolt hole positioned adjacent one of said service apertures, each bolt hole having one of said crush limiters at least partially surrounding said bolt hole.

* * * * *